(12) United States Patent
Raichelgauz et al.

(10) Patent No.: US 9,087,049 B2
(45) Date of Patent: Jul. 21, 2015

(54) SYSTEM AND METHOD FOR CONTEXT TRANSLATION OF NATURAL LANGUAGE

(71) Applicant: Cortica, Ltd., Tirat Carmel (IL)

(72) Inventors: Igal Raichelgauz, Ramat Gan (IL); Karina Ordinaev, Ramat Gan (IL); Yehoshua Y. Zeevi, Haifa (IL)

(73) Assignee: Cortica, Ltd., Tel Aviv (IL)

( * ) Notice: Subject to any disclaimer, the term of this patent is extended or adjusted under 35 U.S.C. 154(b) by 274 days.

(21) Appl. No.: 13/773,118

(22) Filed: Feb. 21, 2013

(65) Prior Publication Data
US 2013/0166276 A1    Jun. 27, 2013

Related U.S. Application Data

(63) Continuation-in-part of application No. 13/344,400, filed on Jan. 5, 2012, now Pat. No. 8,959,037, which is a continuation of application No. 12/434,221, filed on May 1, 2009, now Pat. No. 8,112,376, application No.
(Continued)

(30) Foreign Application Priority Data

Oct. 26, 2005   (IL) .......................................... 171577
Jan. 29, 2006   (IL) .......................................... 173409
Aug. 21, 2007   (IL) .......................................... 185414

(51) Int. Cl.
*G06F 17/27* (2006.01)
*G06F 17/28* (2006.01)
(Continued)

(52) U.S. Cl.
CPC .............. *G06F 17/28* (2013.01); *G06F 17/289* (2013.01); *H04N 21/234336* (2013.01);
(Continued)

(58) Field of Classification Search
CPC ..... G10L 15/26; G10L 15/22; G10L 15/1815; G10L 15/30; G10L 13/00; G10L 13/08; G10L 17/00; G10L 17/08; G10L 2021/105; G10L 21/06; G06F 3/167; G06F 17/2705; G06F 17/28; G06F 17/289; G06F 17/30011; G06F 17/3028; G06F 17/30616; G06F 17/30654; G06F 17/30672; G06F 17/30684; G06F 17/30707; G06F 17/30734; G06F 17/30796; G06F 17/3087; G06F 17/20961
USPC ......... 704/270, 275, 251, 235, 246, 257, 260, 704/270.1, 265, 276, 2–9; 707/724, 729, 707/736, 749, 752, 999.005
See application file for complete search history.

(56) References Cited

U.S. PATENT DOCUMENTS 4,972,363 A    11/1990  Nguyen et al.
5,978,754 A *  11/1999  Kumano ........................... 704/3
(Continued)

FOREIGN PATENT DOCUMENTS

WO    WO 02/31764       4/2002
WO    WO 2007/049282   5/2007

OTHER PUBLICATIONS

Foote, Jonathan, et al. "Content-Based Retrieval of Music and Audio", 1997 Institute of Systems Science, National University of Singapore, Singapore (Abstract).
(Continued)

*Primary Examiner* — Vijay B Chawan
(74) *Attorney, Agent, or Firm* — M&B IP Analysts, LLC

(57) ABSTRACT

A method for translating natural language text. The method comprises receiving at least one multimedia element including a first natural language text; generating metadata representing the first natural language text; generating at least one signature for the at least one multimedia element; determining the context of the at least one multimedia element respective of the signature; and searching for a multimedia content element (MMCE) corresponding to the received at least one multimedia element that includes a second natural language text, wherein the search is performed using the at least one signature, the context and metadata generated for the at least input text in a first natural language respective of the context, wherein the second natural language text is a translated text of the first natural language text.

19 Claims, 4 Drawing Sheets

Related U.S. Application Data

13/773,118, which is a continuation-in-part of application No. 13/682,132, filed on Nov. 20, 2012, which is a continuation of application No. 12/195,863, filed on Aug. 21, 2008, now Pat. No. 8,326,775, which is a continuation-in-part of application No. 12/084,150, filed as application No. PCT/IL2006/001235 on Oct. 26, 2006, now Pat. No. 8,655,801.

(51) Int. Cl.

| | | |
|---|---|---|
| *H04N 21/258* | (2011.01) | |
| *H04N 21/2668* | (2011.01) | |
| *H04N 21/466* | (2011.01) | |
| *H04N 21/81* | (2011.01) | |
| *H04N 21/2343* | (2011.01) | |
| *H04N 21/8358* | (2011.01) | |

(52) U.S. Cl.
CPC .... *H04N 21/25891* (2013.01); *H04N 21/2668* (2013.01); *H04N 21/466* (2013.01); *H04N 21/8106* (2013.01); *H04N 21/8358* (2013.01)

(56) References Cited

U.S. PATENT DOCUMENTS

| | | | | |
|---|---|---|---|---|
| 6,052,481 | A | 4/2000 | Grajski et al. | |
| 6,076,088 | A * | 6/2000 | Paik et al. | 707/999.005 |
| 6,122,628 | A | 9/2000 | Castelli et al. | |
| 6,236,959 | B1 * | 5/2001 | Weise | 704/9 |
| 6,243,375 | B1 | 6/2001 | Speicher | |
| 6,381,656 | B1 | 4/2002 | Shankman | |
| 6,422,617 | B1 * | 7/2002 | Fukumoto et al. | 292/216 |
| 6,580,437 | B1 * | 6/2003 | Liou et al. | 715/719 |
| 6,611,628 | B1 | 8/2003 | Sekiguchi et al. | |
| 6,618,711 | B1 | 9/2003 | Ananth | |
| 6,643,620 | B1 * | 11/2003 | Contolini et al. | 704/270 |
| 6,665,657 | B1 | 12/2003 | Dibachi | |
| 6,751,613 | B1 | 6/2004 | Lee et al. | |
| 6,754,435 | B2 | 6/2004 | Kim | |
| 6,804,356 | B1 | 10/2004 | Krishnamachari | |
| 6,819,797 | B1 | 11/2004 | Smith et al. | |
| 6,901,207 | B1 | 5/2005 | Watkins | |
| 7,006,689 | B2 | 2/2006 | Kasutani | |
| 7,013,051 | B2 | 3/2006 | Sekiguchi et al. | |
| 7,020,654 | B1 | 3/2006 | Najmi | |
| 7,260,564 | B1 | 8/2007 | Lynn et al. | |
| 7,302,117 | B2 | 11/2007 | Sekiguchi et al. | |
| 7,313,805 | B1 | 12/2007 | Rosin et al. | |
| 7,340,458 | B2 | 3/2008 | Vaithilingam et al. | |
| 7,353,224 | B2 | 4/2008 | Chen et al. | |
| 7,376,672 | B2 | 5/2008 | Weare | |
| 7,433,895 | B2 | 10/2008 | Li et al. | |
| 7,464,086 | B2 | 12/2008 | Black et al. | |
| 7,526,607 | B1 | 4/2009 | Singh et al. | |
| 7,574,668 | B2 | 8/2009 | Nunez et al. | |
| 7,920,894 | B2 | 4/2011 | Wyler | |
| 7,921,107 | B2 | 4/2011 | Chang et al. | |
| 7,974,994 | B2 | 7/2011 | Li et al. | |
| 7,987,194 | B1 | 7/2011 | Walker et al. | |
| RE42,647 | E * | 8/2011 | Lee et al. | 704/260 |
| 7,991,715 | B2 | 8/2011 | Schiff et al. | |
| 8,000,655 | B2 | 8/2011 | Wang et al. | |
| 8,098,934 | B2 | 1/2012 | Vincent et al. | |
| 8,112,376 | B2 * | 2/2012 | Raichelgauz et al. | 706/46 |
| 8,312,031 | B2 * | 11/2012 | Raichelgauz et al. | 707/756 |
| 8,316,005 | B2 | 11/2012 | Moore | |
| 8,677,377 | B2 * | 3/2014 | Cheyer et al. | 719/310 |
| 8,682,667 | B2 * | 3/2014 | Haughay | 704/246 |
| 8,688,446 | B2 * | 4/2014 | Yanagihara | 704/235 |
| 8,706,503 | B2 * | 4/2014 | Cheyer et al. | 704/275 |
| 8,775,442 | B2 * | 7/2014 | Moore et al. | 707/749 |
| 8,880,539 | B2 * | 11/2014 | Raichelgauz et al. | 707/756 |
| 8,880,566 | B2 * | 11/2014 | Raichelgauz et al. | 707/803 |
| 8,898,568 | B2 * | 11/2014 | Bull et al. | 715/727 |
| 8,959,037 | B2 * | 2/2015 | Raichelgauz et al. | 706/10 |
| 2001/0019633 | A1 | 9/2001 | Tenze et al. | |
| 2002/0123928 | A1 | 9/2002 | Eldering et al. | |
| 2003/0078766 | A1 * | 4/2003 | Appelt et al. | 704/9 |
| 2003/0191764 | A1 | 10/2003 | Richards | |
| 2004/0128142 | A1 * | 7/2004 | Whitham | 704/275 |
| 2004/0153426 | A1 | 8/2004 | Nugent | |
| 2005/0177372 | A1 | 8/2005 | Wang et al. | |
| 2006/0031216 | A1 | 2/2006 | Semple et al. | |
| 2006/0153296 | A1 | 7/2006 | Deng | |
| 2006/0173688 | A1 * | 8/2006 | Whitham | 704/270 |
| 2006/0204035 | A1 | 9/2006 | Guo et al. | |
| 2006/0236343 | A1 | 10/2006 | Chang | |
| 2006/0242554 | A1 | 10/2006 | Gerace et al. | |
| 2006/0248558 | A1 | 11/2006 | Barton et al. | |
| 2006/0253423 | A1 | 11/2006 | McLane et al. | |
| 2007/0074147 | A1 | 3/2007 | Wold | |
| 2007/0130159 | A1 | 6/2007 | Gulli et al. | |
| 2007/0195987 | A1 | 8/2007 | Rhoads | |
| 2007/0220573 | A1 | 9/2007 | Chiussi et al. | |
| 2007/0244902 | A1 | 10/2007 | Seide et al. | |
| 2007/0253594 | A1 | 11/2007 | Lu et al. | |
| 2007/0294295 | A1 | 12/2007 | Finkelstein et al. | |
| 2008/0049629 | A1 | 2/2008 | Morrill | |
| 2008/0072256 | A1 | 3/2008 | Boicey et al. | |
| 2008/0163288 | A1 | 7/2008 | Ghosal et al. | |
| 2008/0201299 | A1 | 8/2008 | Lehikoinen et al. | |
| 2008/0201314 | A1 | 8/2008 | Smith et al. | |
| 2008/0204706 | A1 | 8/2008 | Magne et al. | |
| 2008/0313140 | A1 | 12/2008 | Pereira et al. | |
| 2009/0089587 | A1 | 4/2009 | Brunk et al. | |
| 2009/0119157 | A1 | 5/2009 | Dulepet | |
| 2009/0172030 | A1 | 7/2009 | Schiff et al. | |
| 2009/0245603 | A1 | 10/2009 | Koruga et al. | |
| 2009/0253583 | A1 | 10/2009 | Yoganathan | |
| 2009/0277322 | A1 | 11/2009 | Cai et al. | |
| 2010/0318493 | A1 | 12/2010 | Wessling | |
| 2010/0322522 | A1 | 12/2010 | Wang et al. | |
| 2011/0202848 | A1 | 8/2011 | Ismalon | |
| 2013/0325550 | A1 | 12/2013 | Varghese et al. | |
| 2014/0019264 | A1 | 1/2014 | Wachman et al. | |

OTHER PUBLICATIONS

Ribert et al. "An Incremental Hierarchical Clustering", Visicon Interface 1999, pp. 586-591.

Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Cernansky et al., "Feed-forward Echo State Networks"; Proceedings of International Joint Conference on Neural Networks, Montreal, Canada, Jul. 31-Aug. 4, 2005.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Freisleben et al., "Recognition of Fractal Images Using a Neural Network", Lecture Notes in Computer Science, 1993, vol. 6861, 1993, pp. 631-637.

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

(56) References Cited

OTHER PUBLICATIONS

Fathy et al., "A Parallel Design and Implementation for Backpropagation Neural Network Using NIMD Architecture", 8th Mediterranean Electrotechnical Corsfe rersce, 19'96, MELECON '96, Date of Conference: May 13-16, 1996, vol. 3, pp. 1472-1475.
Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.
Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.
Lin, C.; Chang, S.: "Generating Robust Digital Signature for Image/Video Authentication", Multimedia and Security Workshop at ACM Mutlimedia '98; Bristol, U.K., Sep. 1998; pp. 49-54.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Maass, W. et al.: "Computational Models for Generic Cortical Microcircuits", Institute for Theoretical Computer Science, Technische Universitaet Graz, Graz, Austria, published Jun. 10, 2003.
Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.
Jaeger, H.: "The "echo state" approach to analysing and training recurrent neural networks", GMD Report, No. 148, 2001, pp. 1-43, XP002466251 German National Research Center for Information Technology.
Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.
Natschlager, T. et al.: "The "liquid computer": A novel strategy for real-time computing on time series", Special Issue on Foundations of Information Processing of Telematik, vol. 8, No. 1, 2002, pp. 39-43, XP002466253.
Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.
Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

International Search Report for the related International Patent Application PCT/IL2006/001235; Date of Mailing: Nov. 2, 2008.
International Search Authority: "Written Opinion of the International Searching Authority" (PCT Rule 43bis.1) including International Search Report for the related International Patent Application No. PCT/US2008/073852; Date of Mailing: Jan. 28, 2009.
International Search Authority: International Preliminary Report on Patentability (Chapter I of the Patent Cooperation Treaty) including "Written Opinion of the International Searching Authority" (PCT Rule 43bis. 1) for the related International Patent Application No. PCT/IL2006/001235; Date of Issuance: Jul. 28, 2009.
IPO Examination Report under Section 18(3) for corresponding UK application No. GB1001219.3, dated Sep. 12, 2011.
Boari et al, "Adaptive Routing for Dynamic Applications in Massively Parallel Architectures", 1995 IEEE, Spring 1995.
Cococcioni, et al, "Automatic Diagnosis of Defects of Rolling Element Bearings Based on Computational Intelligence Techniques", University of Pisa, Pisa, Italy, 2009.
Emami, et al, "Role of Spatiotemporal Oriented Energy Features for Robust Visual Tracking in Video Surveillance, University of Queensland", St. Lucia, Australia, 2012.
Garcia, "Solving the Weighted Region Least Cost Path Problem Using Transputers", Naval Postgraduate School, Monterey, California, Dec. 1989.
Mahdhaoui, et al, "Emotional Speech Characterization Based on Multi-Features Fusion for Face-to-Face Interaction", Universite Pierre et Marie Curie, Paris, France, 2009.
Marti, et al, "Real Time Speaker Localization and Detection System for Camera Steering in Multiparticipant Videoconferencing Environments", Universidad Politecnica de Valencia, Spain, 2011.
Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.
Scheper, et al. "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Theodoropoulos et al, "Simulating Asynchronous Architectures on Transputer Networks", Proceedings of the Fourth Euromicro Workshop on Parallel and Distributed Processing, 1996. PDP '96.
Guo et al, "AdOn: an Intelligent Overlay Video Advertising System", SIGIR, Boston, Massachusetts, Jul. 19-23, 2009.
Mei, et al., "Contextual In-Image Advertising", Microsoft Research Asia, pp. 439-448, 2008.
Mei, et al., "VideoSense - Towards Effective Online Video Advertising", Microsoft Research Asia, pp. 1075-1084, 2007.
Semizarov et al. "Specificity of Short Interfering RNA Determined through Gene Expression Signatures", PNAS, 2003, pp. 6347-6352.

\* cited by examiner

SYSTEM AND METHOD FOR CONTEXT TRANSLATION OF NATURAL LANGUAGE

CROSS-REFERENCE TO RELATED APPLICATIONS

This application is a continuation-in-part (CIP) of:
(a) U.S. patent application Ser. No. 13/344,400 filed on Jan. 5, 2012, now pending, which is a continuation of U.S. patent application Ser. No. 12/434,221, filed May 1, 2009, now U.S. Pat. No. 8,112,376;
(b) U.S. patent application Ser. No. 13/682,132 filed Nov. 20, 2012, which is a continuation application of U.S. patent application Ser. No. 12/195,863, filed Aug. 21, 2008, now U.S. Pat. No. 8,326,775. The Ser. No. 12/195, 863 application claims priority under 35 USC 119 from Israeli Application No. 185414, filed on Aug. 21, 2007, and is also a continuation-in-part of the below-referenced U.S. patent application Ser. No. 12/084,150; and,
(c) U.S. patent application Ser. No. 12/084,150 having a 371 filing date of Apr. 7, 2009, now pending, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006.
All of the applications referenced above are herein incorporated by reference for all that they contain.

TECHNICAL FIELD

The present invention relates generally to the analysis of multimedia content, and more specifically to a system and method for translating a natural language text input.

BACKGROUND

There are billions of web pages available through the Internet; however, the majority of such pages are provided in English. As users are connecting to the worldwide web from all around the world, a need for translation machines has become essential for such users who cannot read English.

Several prior art solutions are available that allow users to enter a text, usually a word or a phrase, as an input and receive the text in the requested language, as an output. The input may also be in a form of voice which is being converted to text using a speech-to-text engine. The converted text is translated and may be transformed back to voice.

The shortcomings of prior art solutions is that the requested input is usually translated on a per-word basis, thus such translations maybe inefficient due to terminology differences between languages. Furthermore, the per-word basis translation is performed out of context, and as such the translated text may not be accurate.

It would therefore be advantageous to provide a solution that overcomes the shortcomings of prior art translation solutions.

SUMMARY

Certain embodiments disclosed herein include a method for translating natural language text. The method comprises receiving at least one multimedia element including a first natural language text; generating metadata representing the first natural language text; generating at least one signature for the at least one multimedia element; determining the context of the at least one multimedia element respective of the signature; and searching for a multimedia content element (MMCE) corresponding to the received at least one multimedia element that includes a second natural language text, wherein the search is performed using the at least one signature, the context and metadata generated for the at least input text in a first natural language respective of the context, wherein the second natural language text is a translated text of the first natural language text.

Certain embodiments disclosed herein also a system for translating natural language text. The system comprises an interface to a network for receiving at least one multimedia element including a first natural language text; and a translation engine for generating metadata representing the first natural language text, wherein the translation engine is further configured to determine the context of the at least one multimedia element respective of the signature and search for a MMCE corresponding to the received at least one multimedia element that includes a second natural language text, wherein the search is performed using at least one signature, the context, and metadata generated for the at least input text in a first natural language respective of the context, wherein the second natural language text is a translated text of the first natural language text.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
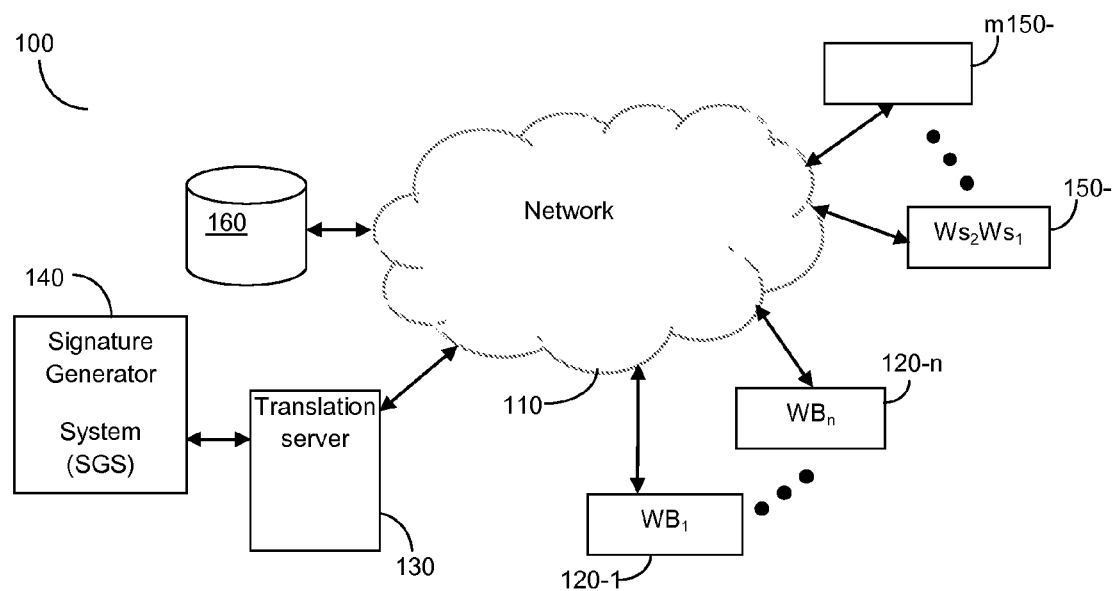
FIG. 1 is a schematic block diagram of a network system utilized to describe the various embodiments disclosed herein.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting schematic diagram of a system 100 utilized for describing the various embodiments for translating a natural language text input in accordance one embodiment. As illustrated in FIG. 1, a network 110 enables the communication between different parts of the system 100. The network 110 may be the Internet, the world-wide-web (WWW), a local area network (LAN), a wide area network (WAN), a metro area network (MAN), and the like.

Further connected to the network 110 are client applications, such as web browsers (WB) 120-1 through 120-n (collectively referred to hereinafter as web browsers 120 or individually as a web browser 120). A web browser 120 is executed over a computing device, which may be, for example, a personal computer (PC), a personal digital assistant (PDA), a mobile phone, a tablet computer, and the like. The computing device is configured to at least provide multimedia elements to servers connected to the network 110.

The multimedia elements provided by a computing device can be locally saved in the computing device or can be captured by the device. For example, the multimedia image may be an image captured by a camera installed in the client device, a video clip saved in the device, and so on. A multimedia element may be, for example, an image, a graphic, a video stream, a video clip, an audio stream, an audio clip, a video frame, a photograph, an image of signals (e.g., spectrograms, phasograms, scalograms, etc.), and/or combinations thereof and portions thereof.

The system 100 also includes a plurality of information sources 150-1 through 150-m (collectively referred to hereinafter as information sources 150 or individually as a information sources 150) being connected to the network 110. Each of the information sources 150 may be, for example, a web server, an application server, a data repository, a database, and the like. Also connected to the network 110 is a data warehouse 160 that stores multimedia elements and metadata generated with respect to each multimedia element or a cluster of multimedia elements. In the embodiment illustrated in FIG. 1, a translation sever 130 communicates with the data warehouse 160 through the network 110. In other non-limiting configurations, the translation sever 130 is directly connected to the data warehouse 160.

The various embodiments disclosed herein are realized using the translation server 130 and a signature generator system (SGS) 140. The SGS 140 may be connected to the translation server 130 directly or through the network 110. The web browsers 120 can access the translation server 130 to enter an input for translation and to receive the translated output. The input text can be provided as free text. In a preferred embodiment, the text for translation is embedded in a multimedia element. For example, the input may include an image of a billboard sign with a tagline written in German. In another embodiment, the input translation may be related to speech or vocals in a video or audio clip. The translated output may include the translated text, a multimedia element including the translated content, or translated text/audio respective of the text, speech or vocals embedded in the input multimedia content. For example, the output of the image of the billboard with the tagline written in German may be a corresponding image of the billboard where the tagline is English.

The translation server 130 is enabled to receive and serve multimedia elements and causes the SGS 140 to generate a signature respective of the multimedia elements. The process for generating the signatures for multimedia elements is explained in more detail herein below with respect to FIGS. 3 and 4. Each of the translation server 130 and the SGS 140, typically comprises a processing unit, such as a processor (not shown) that is coupled to a memory. The memory contains instructions that can be executed by the processing unit. The translation server 130 also includes an interface (not shown) to the network 110.

According to the disclosed embodiments, the translation server 130 is configured to receive, from a web browser 120 an input multimedia element that includes text or voice in a natural language. A user can provide an input multimedia element to perform the translation through a web site enabled to upload the multimedia element to the translation server 130. The uploaded multimedia element may be a file or a link to a location of the multimedia element. The multimedia element is uploaded to input to the querying server together with a translation request designating at least the target natural language, i.e., the language of the translated text or speech in the input element. In another embodiment, the multimedia element and the translation request can be generated and sent by a script executed in the web page visited by the web browser 120 or an add-on (not shown) installed in the web browser.

The translation server 130 generates metadata related to the input multimedia element. The metadata is in the form of natural language preferences related to the language of the text or speech in the input multimedia element. The metadata includes, for example, amount of words or letters, phonemic information, and so on characterizing the natural language that appears in the input multimedia element. For example, often is the case where a phrase comprised of a plurality of words such as "good luck" in English is translated to a one-word phrase in a different natural language. In such cases it is important to determine the actual context of the input natural language. The generated metadata is saved in the data warehouse 160 allowing the creation of a vocabulary for further use.

The SGS 140 generates at least one signature for the input multimedia element or each portion thereof, as provided by the translation server 130. The generated signature(s) may be robust to noise and distortions as discussed below. Then, using the signature(s) provided by the SGS 140, the translation server 130 determines the context of the input multimedia element. For example, an input image of a movie poster is associated with the context "movies". An exemplary technique for determining a context of a multimedia element based on signatures is described in detail in U.S. patent application Ser. No. 13/770,603, filed Feb. 19, 2013, which is assigned to common assignee, which is hereby incorporated by reference for all the useful information it contains.

Using the metadata, comprised of at least one signature and context determined for the input data element, the translation server 130 searches for a corresponding multimedia content element (MMCE) that includes text in the target natural language. The MMCEs are saved in the data warehouse 160. To enable fast and accurate retrieval of MMCEs from the warehouse 160, an MMCE is searched using the signature and context. With this aim, according to one embodiment, the multimedia contents in the data warehouse 160 are indexed using signatures and context. If an MMCE is found through the search, then its metadata is compared to the metadata generated for the input data element. Two sets of metadata are determined to match each other if at least one of the number of words, letters, and phonemic information of the natural language text in the input element matches the target natural language. For example, "good luck" in English is one word in Chinese. Thus, the comparison between the two sets of metadata allows finding an MMCE with the translated text. It should be noted that if more than one MMCE is detected through the search, the most accurate MMCE that represents the input element with the translated text is selected based on the metadata. The retrieved MMCE with the translated text is returned to the web browser 120.

It should be noted that the search performed by the translation server 130 is not limited to the data warehouse. The search can be performed using signatures generated by the SGS 140 and the identified context in data sources that index searchable content including, but not limited to, multimedia contents using signatures and concepts. A context is determined as the correlation between a plurality of concepts. An example for such indexing techniques using signatures is disclosed in a co-pending U.S. patent application Ser. No. 13/766,463, filed Feb. 13, 2013 entitle "A SYSTEM AND METHODS FOR GENERATION OF A CONCEPT BASED DATABASE", assigned to common assignee, is hereby incorporated by reference for all the useful information it contains.

Following is a non-limiting example for the operation of the translation server 130. An input image is received at the translation server 130. The input image is a poster of the movie "The Terminator 2". The poster includes the movie title "The Terminator 2" in Chinese. The translation sever 130 detects the text "The Terminator 2" in the input image. Then metadata is generated for "The Terminator 2" indicating the number of characters in the Chinese language for the movie title. Then, context of the text and input image are determined. For example, the actor shown in the poster together with the number '2' in the title indicates that the context is cinema. Thereafter, at least one signature is generated for the input image and the translation server 130 then determines the context of the text. Using the metadata, context and signature(s), the translation server 130 searches for a poster corresponding to the input poster, with a title in English. A similar poster of the movie "The Terminator 2" in English is then identified as contextually related to the Chinese poster, thereby providing translated text of the movie title "The Terminator 2".

It should be noted that the operation of the translation server 130 is equally applicable to speech and vocals in the input multimedia element, and not limited to natural language text. For example, a video clip with translated audio can be provided by the translation server 130 using the techniques disclosed herein. It should be further that natural language attributes, such text and speech are detected in the input multimedia element by the translation server 130. The translation server 130 treats such attributes as a portion of a multimedia element.

Figure 2:
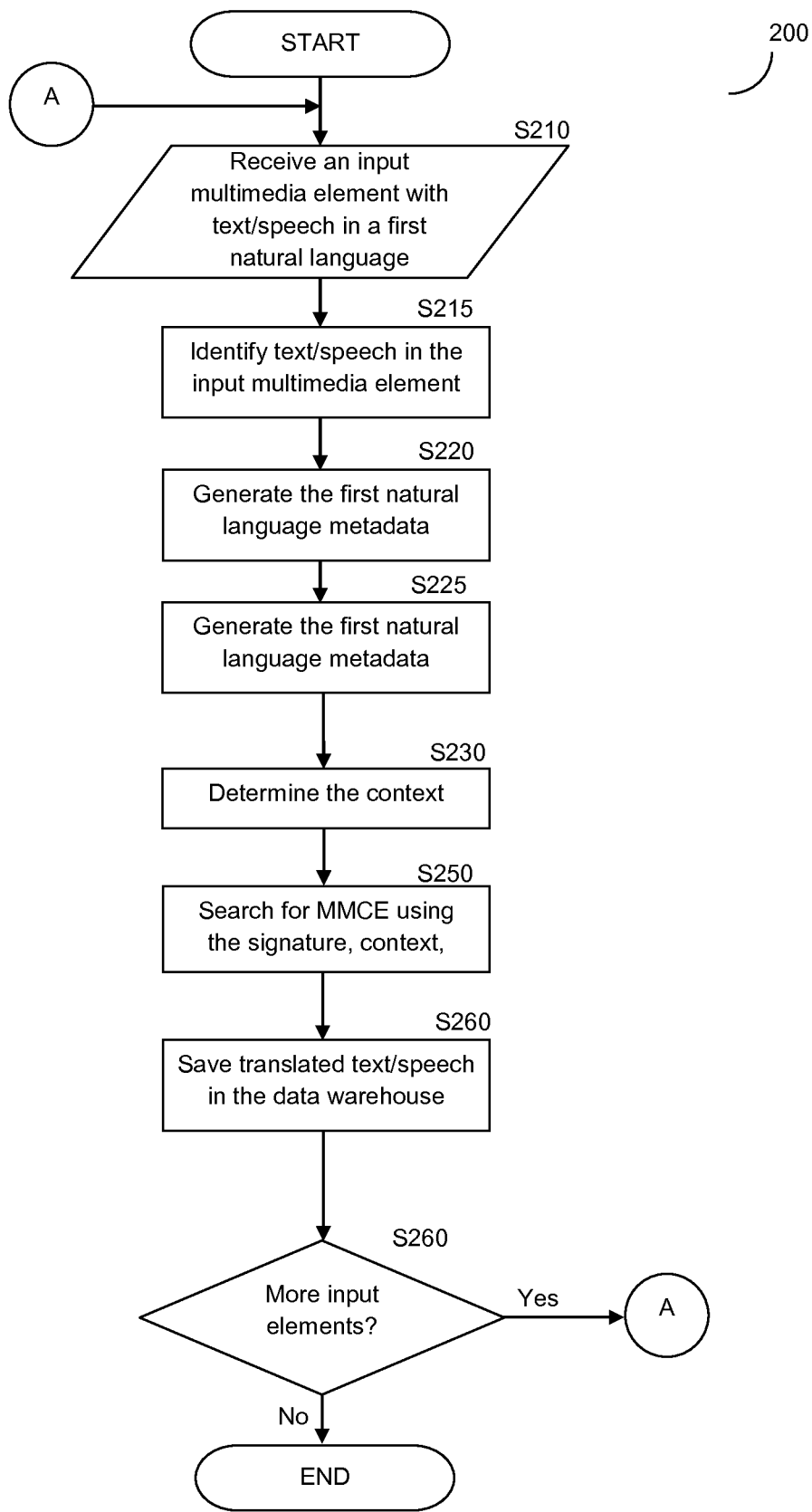
FIG. 2 is a flowchart describing a process of translating an input natural language text embedded in a multimedia element according to one embodiment.

FIG. 2 is an exemplary and non-limiting flowchart 200 that shows the operation of translating server 130 according to one embodiment. In S210, the translation server 130 receives an input multimedia element including text in a first natural language and a translation request indicating the target natural language. In S215, the first natural language text in the input multimedia element is identified. In S220, metadata respective of the first language text is generated by the translation server 130. The metadata may include, for example, identifiers of the first language, amount of words and/or letters that comprise the text, phonemic information, appearance of the text, and so on. In one embodiment, the metadata is generated by recognizing the language type of the first natural language text, counting the words, letters, and identifying special phonemic attributes in the text (e.g., suffix letters, digraphs, etc.). The metadata generation as discussed can be performed using text analysis techniques known in the related art.

In S225, at least one signature is generated for input multimedia element using the SGS 140, as further described herein below with respect of FIGS. 3 and 4. In one embodiment, a signature can also be generated for the first natural language text in the multimedia element. In S230, respective of the generated signature, the server 130 determines the context of the input multimedia element. An exemplary technique that can be utilized to identify the input multimedia element can be found in the patent application Ser. No. 13/770,603, referenced above. In S240, the server 130 searches for a MMCE that corresponds to the input multimedia element, but that includes text in the target natural language. The search is performed at least in the data warehouse 160 as discussed in detail above.

Optionally, in S250, the translation of the input text is stored in the data warehouse together with the input multimedia element for further use. In addition, the first language natural text can be stored in the metadata of the retrieved MMCE in the MMCE. In S260, it is checked whether additional text is received and if so, execution continues with S210; otherwise, execution terminates.

It should be noted that the operation of the method described herein is equally applicable to natural language speech and vocals in the input multimedia element, and not limited to natural language text.

Figure 3:
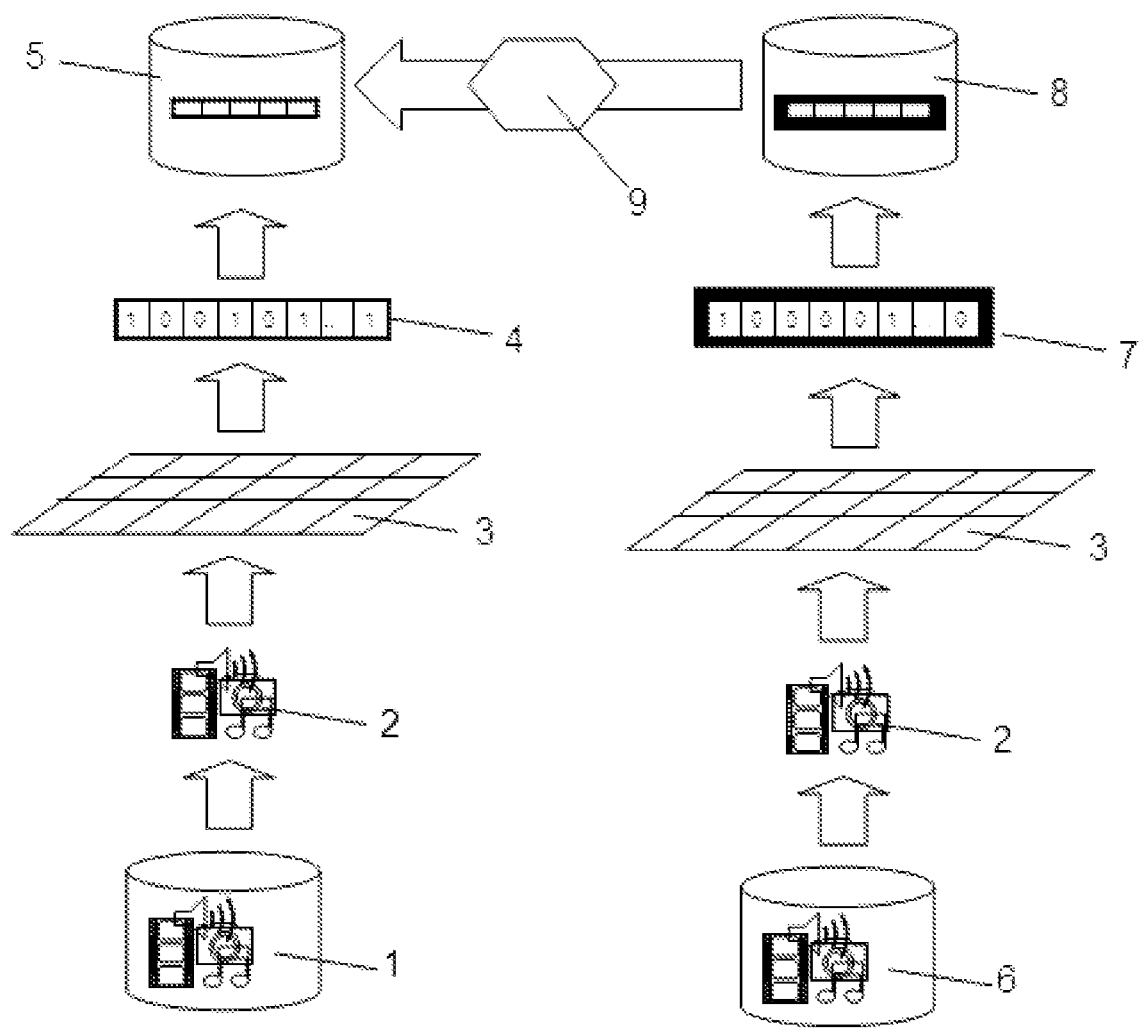
FIG. 3 is a block diagram depicting the basic flow of information in the signature generator system.
Figure 4:
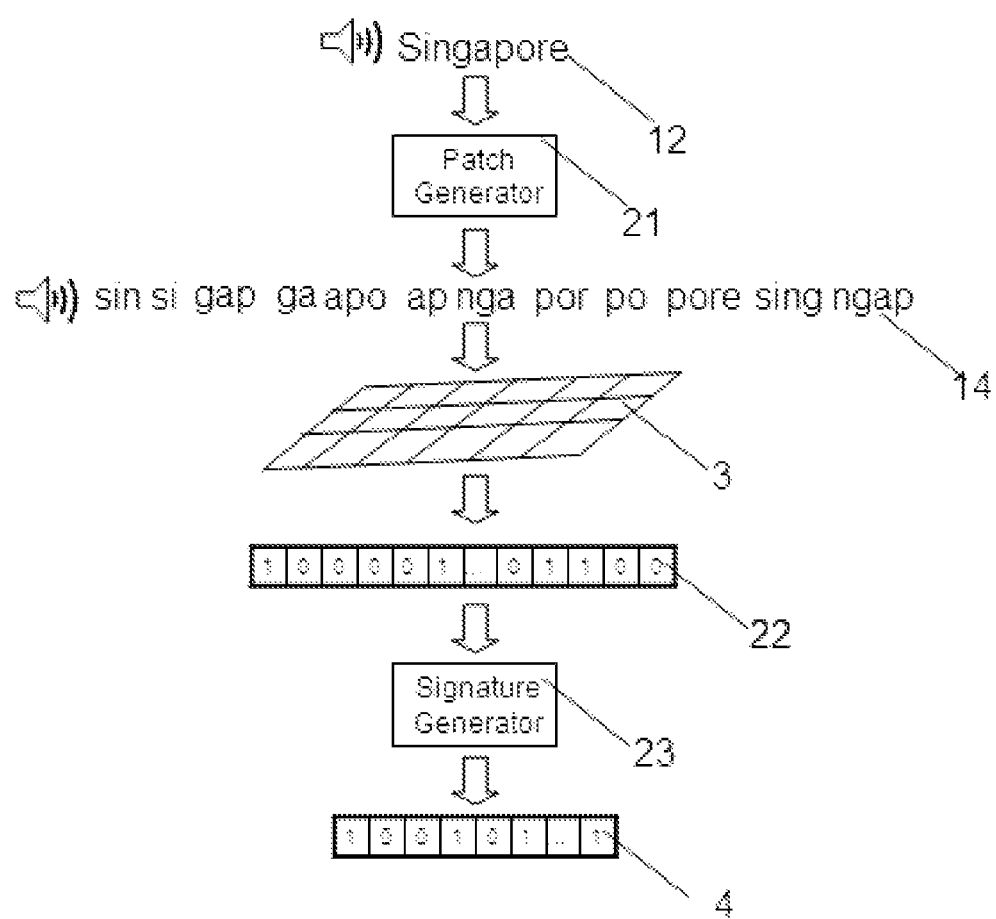
FIG. 4 is a diagram showing the flow of patches generation, response vector generation, and signature generation in a large-scale speech-to-text system.

FIGS. 3 and 4 illustrate the generation of signatures for the multimedia content elements by the SGS 140 according to one embodiment. An exemplary high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process is now described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame T is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \leq i \leq L$) may consist of a single leaky integrate-to-threshold unit (LTU) node or more nodes. The node $n_i$ equations are:

$$V_i = \sum_j w_{ij} k_j$$

$$n_i = \Box(V_i - Th_x)$$

where, □ is a Heaviside step function; $w_{ij}$ is a coupling node unit (CNU) between node i and image component j (for example, grayscale value of a certain pixel j); $k_i$ is an image component 'j' (for example, grayscale value of a certain pixel j); Thx is a constant Threshold value, where x is 'S' for Signature and 'RS' for Robust Signature; and Vi is a Coupling Node Value.

The Threshold values $Th_x$ are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:

1: For: $V_i > Th_{RS}$
   $1 - p(V > Th_S) - 1 - (1-\epsilon)^l \ll 1$ i.e., given that l nodes (cores) constitute a Robust Signature of a certain image I, the probability that not all of these l nodes will belong to the Signature of same, but noisy image, • is sufficiently low (according to a system's specified accuracy).

2: $p(V_i > TH_{RS}) \approx l/L$ i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found U.S. Pat. Nos. 8,326,775 and 8,312,031, assigned to common assignee, is hereby incorporated by reference for all the useful information it contains.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

Detailed description of the Computational Core generation and the process for configuring such cores is discussed in more detail in the co-pending U.S. patent application Ser. No. 12/084,150 referenced above.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for translating natural language text, comprising:
   receiving at least one multimedia element including a first natural language text;
   generating metadata representing the first natural language text;
   generating at least one signature for the at least one multimedia element;
   determining the context of the at least one multimedia element respective of the signature; and
   searching for a multimedia content element (MMCE) corresponding to the received at least one multimedia element that includes a second natural language text, wherein the search is performed using the at least one signature, the context and metadata generated for the at least input text in a first natural language respective of the context, wherein the second natural language text is a translated text of the first natural language text.

2. The method of claim 1, further comprising:
   identifying the first natural language text in the received at least one multimedia element.

3. The method of claim 1, further comprising:
   generating at least one signature for the first natural language text;
   determining the context of the first natural language text; and
   searching for a corresponding MMCE also using the at least one signature and context generated for the first natural language text.

4. The method of claim 1, wherein the metadata includes at least one of: identifiers of the first language text, amount of words in the first language text, letters in the first language text, phonemic information, and appearance of the text.

5. The method of claim 1, wherein searching for the corresponding MMCE further comprises:
   searching a data warehouse for MMCEs that match the context and the at least one signature;
   comparing metadata associated with each MMCE retrieved through the search to the metadata generated for the first natural language search; and
   returning the MMCE that matches the metadata generated for the first natural language search.

6. The method of claim 1, wherein the first natural language text includes any one of speech and vocal in the first natural language.

7. The method of claim 1, wherein the at least one signature is robust to noise and distortion.

8. The method of claim 1, wherein the multimedia content is at least one of: an image, graphics, a video stream, a video clip, an audio stream, an audio clip, a video frame, a photograph, images of signals, combinations thereof, and portions thereof.

9. A non-transitory computer readable medium having stored thereon instructions for causing one or more processing units to execute the method according to claim 1.

10. A system for translating natural language text, comprising:
    an interface to a network for receiving at least one multimedia element including a first natural language text; and
    a translation engine for generating metadata representing the first natural language text, wherein the translation engine is further configured to determine the context of the at least one multimedia element respective of the signature and search for a MMCE corresponding to the received at least one multimedia element that includes a second natural language text, wherein the search is performed using at least one signature, the context, and metadata generated for the at least input text in a first natural language respective of the context, wherein the second natural language text is a translated text of the first natural language text.

11. The system of claim 10, further comprising:
    a signature generator system (SGS) for generating the at least one signature for the at least one received multimedia element and at least one signature for the at least one first natural language input text, wherein each of the at least one signature is robust to noise and distortion.

12. The system of claim 11, wherein the signature generator system further comprises:
    a plurality of computational cores configured to receive the at least one multimedia element, each computational core of the plurality of computational cores having properties that are at least partly statistically independent from other of the plurality of computational cores, the properties are set independently of each other core.

13. The system of claim 10, further comprises:
    a data warehouse for maintaining a plurality of MMCEs and their respective metadata.

14. The system of claim 10, wherein the translation engine is further configured to:
    identify the first natural language text in the received at least one multimedia element.

15. The system of claim 10, wherein the translation engine is further configured to:
    generate at least one signature for the first natural language text;
    determine the context of the first natural language text; and
    search for a corresponding MMCE also using the at least one signature and context generated for first natural language text.

16. The system of claim 10, wherein the metadata includes at least one of: identifiers of the first language text, amount of words in the first language text, letters in the first language text, phonemic information, and appearance of the text.

17. The system of claim 10, wherein the translation engine is further configured to:
    search a data warehouse for MMCEs that match the context and the at least one signature;
    compare metadata associated with each MMCE retrieved through the search to the metadata generated for the first natural language search; and
    return the MMCE that matches the metadata generated for the first natural language search.

18. The system claim 10, wherein the first natural language text includes any one of speech and vocal in the first natural language.

19. The system of claim 10, wherein the multimedia content is at least one of: an image, graphics, a video stream, a video clip, an audio stream, an audio clip, a video frame, a photograph, images of signals, combinations thereof, and portions thereof.

* * * * *